United States Patent [19]

Yoshinaga

[11] 3,741,714

[45] June 26, 1973

[54] PIEZOELECTRIC TYPE GAS LIGHTER

[75] Inventor: Sadao Yoshinaga, Tokyo, Japan

[73] Assignee: Prince Sangyo Kabushiki Kaisha, Tokyo, Japan

[22] Filed: July 22, 1971

[21] Appl. No.: 165,072

[30] Foreign Application Priority Data

July 27, 1970 Japan ................................ 45/74177

[52] U.S. Cl. ................................................ 431/255

[51] Int. Cl. ................................................ F23q 3/01

[58] Field of Search ............................ 431/132, 255; 320/8.7

[56] References Cited

UNITED STATES PATENTS

| | | | |
|---|---|---|---|
| 3,425,783 | 2/1969 | Goto | 431/255 |
| 3,506,386 | 4/1970 | Goto | 431/255 |
| 3,540,823 | 11/1970 | Ebine | 431/255 |
| 3,576,383 | 4/1971 | Fuller | 431/255 |

*Primary Examiner*—Edward G. Favors

*Attorney*—James D. Halsey, Jr., Edward S. Irons et al.

[57] ABSTRACT

A piezoelectric type gas lighter including a fuel tank having a fuel spouting nozzle, a piezoelectric unit, and a discharge electrode all within a casing, characterized in that the discharge electrode covered by an insulating coating except a tip thereof is fixed to an insulated supporting member, an insulated lead wire led out of piezoelectric elements included in the piezoelectric unit is removed its insulation at an end thereof, the rear end of the discharge electrode and the thus exposed forward end of the lead wire are electrically connected through a conductive sheath of a required length, and the thus connected portion of the lead wire and the discharge electrode is further protected by an insulating tubular body.

3 Claims, 6 Drawing Figures

INVENTOR

BY Chas, Sears, Staas, Halsey & Santorelli

ATTORNEYS

INVENTOR

BY Irons, Sears, Haas, Halsey & Santorelli

ATTORNEYS

PIEZOELECTRIC TYPE GAS LIGHTER

BACKGROUND OF THE INVENTION

This invention relates to a piezoelectric type gas lighter wherein a piezoelectric ignition element generates a high voltage upon application of an impulsive force, the high voltage led to an electrode located above a valve of the lighter being caused to be discharged through the gas delivered through the valve so that the lighter is thereby ignited.

The conventional piezoelectric type gas lighter, particularly of portable type, has been provided with a fuel tank and the piezoelectric element disposed side-by-side and fixed to a bottom plate of the lighter in an integral manner, so that these two are thereafter enveloped in a casing of the lighter to provide a beautiful appearance required for a merchandise.

Furthermore, the discharge electrode has been composed of the tip of a lead wire connected to the piezoelectric element included in a piezoelectric unit, and when the piezoelectric unit is required to be assembled in the casing of the lighter, an insulating supporting member should be at first attached to the tip of the lead wire so that an end of the lead wire protrudes from the insulating supporting member thereby to form a discharging electrode. In addition, fixing of the piezoelectric unit should be carried out after the insulating supporting member has been bonded to for instance frame of the lighter employing an adhesive, such a procedure requiring much labor in the assembling of the lighter. Moreover, in the case of the discharge electrode is damaged or when the piezoelectric unit has any trouble, either one of the discharge electrode or the piezoelectric unit cannot be replaced separately because these are combined integrally, such a fact constituting another drawback of the conventional piezoelectric type gas lighter.

SUMMARY OF THE INVENTION

Therefore, a primary object of the present invention is to provide a piezoelectric type gas lighter wherein the fuel tank, piezoelectric unit, and discharge electrode and its operating member can be rationally assembled on the bottom plate, and the fixing of the casing and assembling and disassembling of various members can be achieved by means of one machine screw.

Another object of the present invention is to provide a piezoelectric type gas lighter, the discharge electrode of which is composed of a material other than the lead wire and is linked through an electrically conductive tubular member to the lead wire, whereby when either one of the discharge electrode or the piezoelectric unit has any trouble, only the one having trouble can be replaced, and the assembling of these members can be carried out without requiring any labor.

Still another object of the present invention is to provide a piezoelectric type gas lighter wherein the attachment of an insulating support of an electrode located above the flame nozzle of the lighter can be carried out extremely easily.

The nature, principle, and utility of the present invention will be more fully understood from the following detailed description of the invention when read in conjunction with the accompanying drawings.

DETAILED DESCRIPTION OF THE INVENTION

Figure 1:
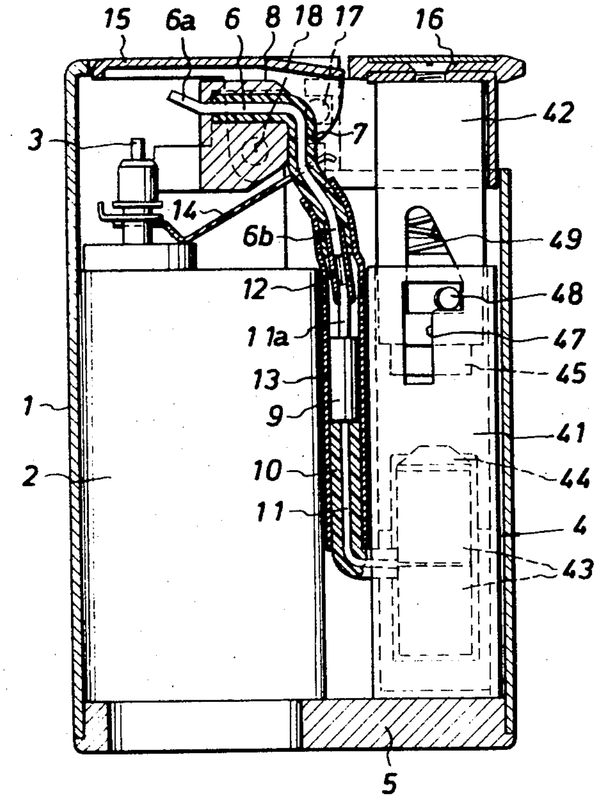
FIG. 1 is a front elevational view, partly in section, of a piezoelectric gas lighter according to the present invention.
Figure 2:
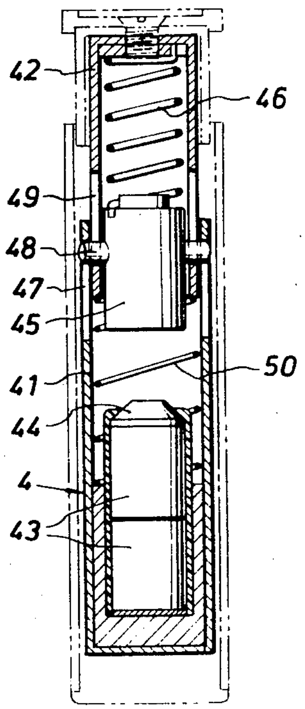
FIG. 2 is a longitudinal sectional view of a piezoelectric unit employed in this gas lighter.
Figure 3:
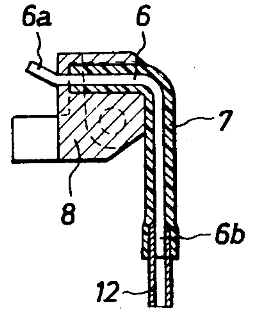
FIG. 3 is a longitudinal sectional view of an electrode supporting member.

In the gas lighter of the first embodiment of the present invention shown in FIGS. 1 and 3, numeral 1 designates a casing the upper and lower ends thereof being opened, numeral 2 designates a fuel tank having a nozzle 3 for delivering fuel gas and fixed integrally onto a bottom plate 5. Numeral 4 designates a piezoelectric unit set side-by-side with the fuel tank 2 onto the bottom plate 5, which comprises a stationary portion 41 and a movable portion 42 which can slide inside of the stationary portion 41 in the vertical direction. Inside of the stationary portion 41, piezoelectric elements 43, 43 are provided which can generate a high voltage when an impacting member 45 inside of the movable portion 42 impacts the piezoelectric elements 43, 43 through an impacting gap 44.

Numeral 6 designates a discharge electrode located above the delivery nozzle 3 of the gas lighter. All over the outer surface of the discharge electrode 6 except the tip **6*a* is coated by an insulating layer 7, and the thus coated discharge electrode 6 penetrates a porcelain supporting member 8 and is fixed to the member 8 which is bonded to mounting plates 21 rising up inside of the casing at both sides of the fuel tank 2**.

Furthermore, a resistor 9 and a predetermined length of lead wire 11 connected thereto are led out of the piezoelectric element 43 inside of the piezoelectric unit 4, and the tip **11*a* of the lead wire 11 is exposed to the outside. A conductive tubular member of sheath 12 of a required measurement and made of copper, silver, or their alloy connects the exposed tip 11*a* of the lead wire 11 to the rearward end 6*b* of the above described discharge electrode 6, and whole of the connected members or portions are coated with a flexible insulating tubular body 13**.

When the above described piezoelectric type gas lighter is desired to be assembled, the fuel tank 2 is fixed on the bottom plate 5 at the corresponding position, and the piezoelectric unit 4 is placed at a position side-by-side with the fuel tank 2 with the lead wire side thereof directed inwardly. Then the lower end of the stationary portion 41 of the piezoelectric unit 4 is fixed to the bottom plate 5 by means of a screw. After the completion of the setting of the piezoelectric unit 4, an opening-and-closing plate 14 for the nozzle 3 is inserted on the neck portion of the fuel delivering nozzle 3, and the insulating electrode-supporting member 8, through which the discharging electrode 6 penetrates, is placed between the mounting plates 21. The rear end **6*b* of the discharge electrode 6 slipped in one end of the conductive sheath 12** is inserted into the flexible insulating tube 13, and the other end of the conductive sheath 12 is connected to the forward end 11*a* of the lead wire 11. Then the electrode supporting member 8 is bonded to the mounting plates 21, and the discharging tip 6*a* of the electrode 6 is located obliquely upward of the fuel delivering nozzle 3.

When the inner members of the gas lighter have thus been assembled together, the casing 1 is slipped over these members from upside of the assembly, and a cover 15 is pivoted on said pedestal 21 so that the cover 15 can be freely opened or closed under the action of a pin 17 provided on an operating member 16. The pin 17 also acts to operate the nozzle opening-and-closing plate 14. When the operating member 16 is fixed to the upper surface of the movable portion 42 of the piezoelectric unit 4, all of the assembling work of the gas lighter will be completed.

When the operating member 16 of the thus assembled gas lighter is depressed inside of the casing 1 by finger, the movable portion 42 of the piezoelectric unit 4 is at first moved downwardly, and during the downward movement of the operating member 16, the cover 15 is rotated clockwisely by means of the pin 17 provided at the forward portion of the operating member 16 around a shaft 18, so that the upper part of the fuel delivering nozzle is opened to the outside. Furthermore, the nozzle opening-and-closing plate 14 is depressed by the pin 17 at the rear end, and the fuel delivering nozzle 3 is opened by the forward end of the plate 14 and the liquefied gas is delivered from the nozzle 3.

Upon the movement of the above mentioned movable portion 42, an impact spring 46 disposed between the movable portion 42 and impacting piece 45 is compressed, and energy is stored in the impact spring 46 when a supporting pin 48 of the impact piece 45 is held by a horizontal portion of an inverted L-shaped guiding groove 47 in the stationary portion 41 of the piezoelectric unit 4. However, this energy is released when the supporting pin 48 of the impact piece 45 is shifted horizontally by means of a tapered surface of a window 49 cut through the movable portion 42 of the piezoelectric unit until the supporting pin 48 is brought into the vertical portion of the inverted L-shaped groove 47, whereupon the impact piece 45 is a rapidly shifted downwardly along the vertical portion of the inverted L-shaped groove 47 and collides with the impacting cap 44. Whereby the piezoelectric elements 43, 43 are subjected to severe impact, and a high voltage is developed in these piezoelectric elements. The high voltage is guided through the lead wire 11 and a resistor 9 to the discharge electrode 6, and is discharged to the fuel gas delivering nozzle 3 to ignite the gas.

When for instance cigaret is lighted by the lighter thus ignited and the depression force applied to the operating member 16 is released, the operating member 16 and the movable portion 42 of the piezoelectric unit 4 are instantaneously brought back to their original positions by means of a reset spring 50 disposed at the lower side of the movable portion 42. Returning to the original position of the operating member 16 also resets the cover 15 and the nozzle opening or closing plate 14 in accordance with the resumption of the pin 17 provided on the forward part of the operating member 16, so that the fuel delivering nozzle 3 of the lighter is thereby closed.

In the above described first embodiment of the present invention, since the discharge electrode 6 and the lead wire 11 are provided as separate pieces releasably connected together through the electrically conductive sheath or sleeve 12 placed in the insulating tube 13, the connection of the discharge electrode 6 and the lead wire 11 is much facilitated. More specifically, the connection is carried out by inserting the forward tip of the lead wire 11 into the sheath 12 slipped over the rear end 6*b* or the discharge electrode 6. Accordingly, there is no necessity of attaching the electrode supporting member 8 to the lead wire 11 when the piezoelectric unit 4 is assembled into the gas lighter, and the assembling processed thereof can be substantially simplified. Furthermore, by adjusting the measurement of the lead wire portion to be inserted into the sheath 12 suitably, the exact position of the piezoelectric unit 4 on the bottom plate 5 can be adjusted suitably. Or, the piezoelectric unit 4 can be assembled onto the bottom plate 5 despite of any measurement error which might exist in the length of the lead wire 11. Because the lead wire 11 is connected to the discharge electrode 6 in freely detachable manner, the piezoelectric unit 4 can be easily replaced within the casing 1 of the gas lighter. Furthermore, the discharge electrode 6 can be made of any metal having a distinct discharge effect differing from the metal consisting the lead wire 11, whereby the ignition effect of the discharge electrode to the fuel gas can be substantially improved, and a gas lighter of least misfire can be thereby obtained.

Figures 4, 5, 6:
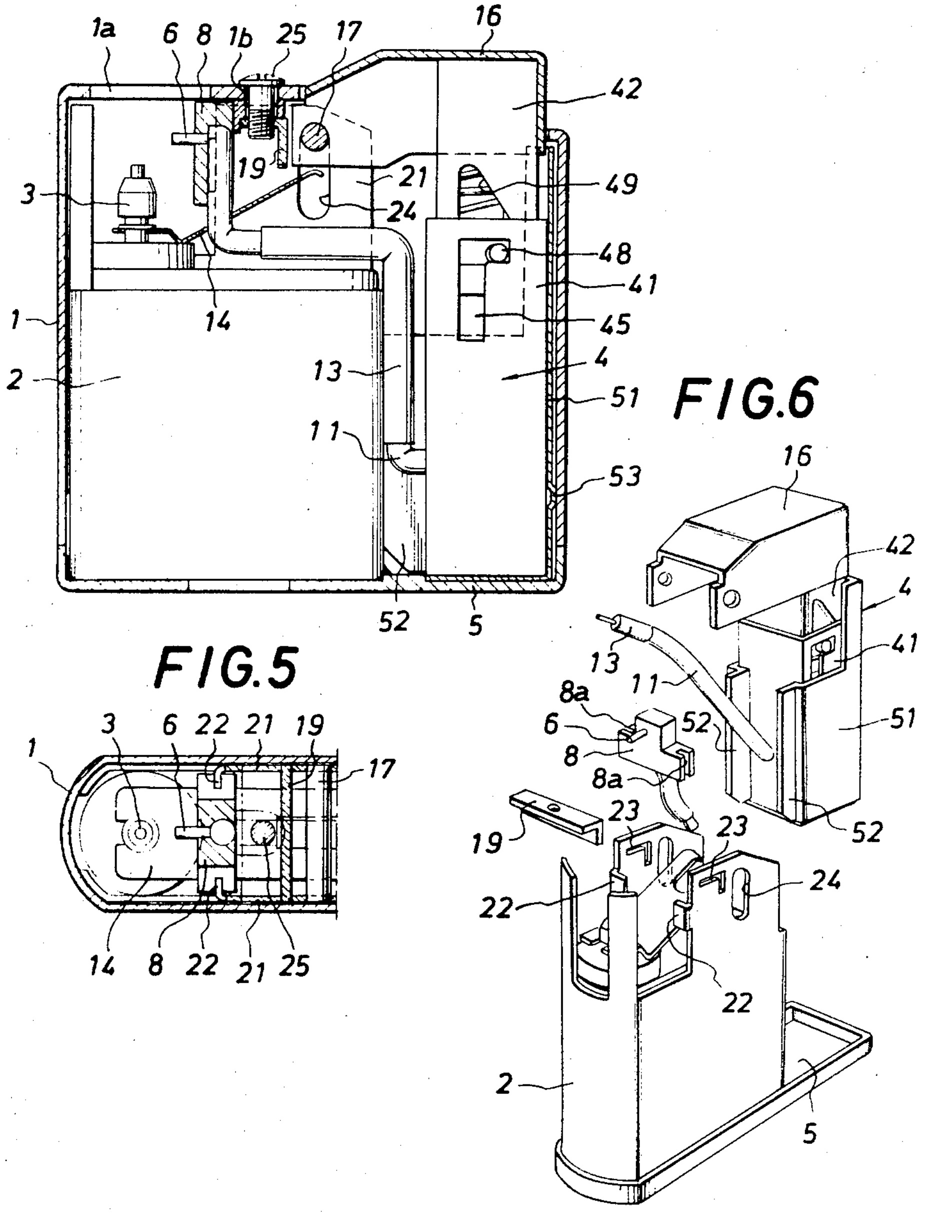
FIG. 4 is a front elevational view, partly in section, of another piezoelectric gas lighter constituting another embodiment of the present invention.
FIG. 5 is a lateral sectional plan view of an electrode supporting member employed in the gas lighter shown in FIG. 4.
FIG. 6 is a perspective view showing the assembled state of a gas lighter shown in FIG. 4.

In FIGS. 4 through 6, there is indicated a gas lighter constituting another embodiment of the present invention the assembling of which is further simplified. In this embodiment, the fuel tank 2 is provided integral therewith a pair of mounting plates 21, 21 for the electrode supporting member 8, which are rising up from the fuel tank 2 at both sides of the fuel spouting nozzle 3. From the pair of mounting plates 21, 21, supporting tabs 22, 22 for the electrode supporting member 8 are bent inwardly in a confronting manner, and through each of the mounting plates 21, 21, there are cut a slit 23 adapted to pass one end of a seating plate 19 which is formed into an angular section having a horizontal and vertical web and another elongated hole 24 located rearward of the slit 23 for guiding one end of the pin 17 provided on the operating member 16 along the vertical direction.

The bottom plate 5 is formed in such a manner that it has a peripheral edge rising up from the bottom plate 5, and, on the required portions of the bottom plate 5, there are bored two holes. On the reaward portion of the bottom plate 5 as seen in FIG. 4, the piezoelectric unit 4 is mounted. The piezoelectric unit 4 has a frame body 51 formed to have a projected portion 53 at the rear side and two spacing edges 52, 52 at the forward side thereof to maintain a predetermined distance from the fuel tank 2.

When the gas lighter of this embodiment of the invention is assembled, the fuel tank 2 is at first welded to the forward portion on the bottom plate 5. Then the piezoelectric unit 4 beforehand inserted in the frame body 51 so that the lead wire 11 and the resistor 9 are located between the two spacing edges 52, 52 is placed in the rearward portion on the bottom plate 5 so that the forwardly directing two spacer edges 52, 52 abut the rear side surface of the fuel tank 2. By this way, the piezoelectric unit 4 can be set side-by-side with the fuel tank 2 on the bottom plate 5 with the lead wire 11 and the resistor 9 included in a space defined by the two spacing edges 52, 52 of the frame body 51 and by the confronting side surfaces of the fuel tank 2 and the piezoelectric unit 4. Then the electrode supporting member 8 is fixed onto the supporting tabs 22, 22 of the mounting plates 21, 21. This can be done simply by inserting the inwardly directing edges of the supporting tabs 22, 22 into grooves 8*a* provided at both sides of the electrode supporting member 8, and if it is desired, a small amount of bonding agent is applied between the supporting tabs 22, 22 and the grooves 8*a*, 8*a*. It should be noted that the connection between the discharge electrode 6 and the lead wire 11 as described before may be carried out before the fixation of the electrode supporting member 8 as described or during the fixation.

After the completion of the assembling of the above described members, the operating member 16 is placed at the top of the movable portion 42 of the piezoelectric unit 4, and the forward part of the operating member 16 is set by the pins 17 passing through the holes 24 of the mounting plates 21, 21, so that the operating member 16 can be moved freely against the mounting plates 21, 21 in the vertical direction. Also in the slits 23 of the mounting plates 21, 21, the hereinbefore described seating plate 19 is inserted traversingly. Then, the casing 1 having a normally opening port 1*a* above the fuel spouting nozzle 3 and a screw hole 1*b* at a position corresponding to that in the seating plate 19 is slipped over from upside of the thus assembled members so that only the operating member 16 is exposed outside, and the assembling of the gas lighter is completed when the casing 1 is fixed to the seating plate 19 by means of a screw 25.

Since the gas lighter of this embodiment of the invention is so constructed that the fuel tank 2 and the piezoelectric unit 4 are set on a single bottom plate 5 and both of the members are combined into one unit by covering these members by a casing 1, there is no necessity of fixing the piezoelectric unit by a screw as in the cases of the conventional gas lighters, whereby the assembling work of the gas lighter can be simplified to that extent. Furthermore, spacing edges 52 are formed at one side of the frame body 51 wherein the piezoelectric unit 4 is inserted to define a space for accommodating the lead wire 11 and the resistor 9, there is no fear of the lead wire 11 and the resistor 9 are damaged by the insertion of the casing 1 and a satisfactory protection is thereby rendered to the lead wire 11 and the resistor 9. In addition, since the mounting plates 21, 21 are formed integrally with the fuel tank 2, and the seating plate 19 for fixing the casing 1 and the insulating member 8 for supporting the discharge electrode 6 or the like are attached to the mounting plates 21, 21, only the fixation of the fuel tank 2 to the bottom plate 5, for instance, by welding can eliminate any other steps of assembling frame plates or the like thereafter.

What is claimed is:

1. A piezoelectric ignition system gas lighter, comprising a casing, a fuel tank mounted within said casing and being provided with a discharge nozzle, a piezoelectric ignition unit mounted within said casing, a discharge electrode mounted within said casing adjacent said nozzle, an electrically conductive lead wire operatively connected at one end to said piezoelectric unit, the opposite end thereof being spaced from said discharge electrode, an electrically conductive sleeve connecting said lead wire and said discharge electrode, insulating material surrounding said lead wire and said discharge electrode and a flexible insulating tube surrounding said insulating material and said electrically conductive sleeve.

2. A piezoelectric ignition gas lighter, comprising a fuel tank, said fuel tank being provided with a pair of mounting plates extending upwardly from the top thereof, said mounting plates being provided with supporting tabs, a supporting member mounted to said tabs, a seating plate, means supporting said seating plate between said mounting plates, a bottom member provided with upstanding walls along the periphery thereof, said fuel tank being welded to a portion of said bottom member, a piezoelectric ignition unit provided with a frame having edges extending outwardly therefrom, said edges engaging said fuel tank thus defining a space between said frame and fuel tank, said piezoelectric ignition unit being provided with an electrically conductive lead wire attached thereto and passing through said space between said fuel tank and said frame of said ignition unit, an operating member, means connecting said operating member to said piezoelectric ignition unit for actuating same, an electrode, means mounting said electrode within said supporting member, a casing provided with a flame port, said casing slidingly mounted over said fuel tank and said piezoelectric ignition unit, one end of said casing abutting said upstanding walls of said bottom member, and means securing the other end of said casing to said seating plate.

3. A piezoelectric ignition gas lighter as in claim 2, wherein said piezoelectric ignition unit comprises a stationary portion, a movable portion mounted to slide vertically within said stationary portion, an impacting piece, a spring normally urging said impacting piece downwardly, piezoelectric elements positioned below said impacting piece, said stationary portion being provided with guiding grooves, said impacting piece further being provided with pins passing through said grooves.

* * * * *